(12) United States Patent  
Bokhari (10) Patent No.: US 8,719,795 B2
(45) Date of Patent: May 6, 2014

(54) SYSTEM AND METHOD FOR AUTOMATING TESTING OF COMPUTERS

(75) Inventor: Enver Bokhari, Holtsville, NY (US)

(73) Assignee: Miami International Security Exchange, LLC, Princeton, NJ (US)

( * ) Notice: Subject to any disclaimer, the term of this patent is extended or adjusted under 35 U.S.C. 154(b) by 306 days.

(21) Appl. No.: 13/084,952

(22) Filed: Apr. 12, 2011

(65) Prior Publication Data

US 2012/0266142 A1 Oct. 18, 2012

(51) Int. Cl.
*G06F 9/44* (2006.01)
(52) U.S. Cl.
USPC .......................................................... 717/127
(58) Field of Classification Search
None
See application file for complete search history.

(56) References Cited

U.S. PATENT DOCUMENTS

| | | | | |
|---|---|---|---|---|
| 6,944,848 | B2* | 9/2005 | Hartman et al. | 717/124 |
| 7,055,065 | B2* | 5/2006 | Farchi et al. | 714/38.1 |
| 7,337,432 | B2* | 2/2008 | Dathathraya et al. | 717/125 |
| 7,451,455 | B1* | 11/2008 | El-Haj | 719/320 |
| 7,478,365 | B2* | 1/2009 | West et al. | 717/124 |
| 7,581,212 | B2* | 8/2009 | West et al. | 717/136 |
| 8,347,267 | B2* | 1/2013 | Givoni et al. | 717/124 |
| 8,397,114 | B2* | 3/2013 | Agrawal | 714/738 |
| 2003/0014734 | A1* | 1/2003 | Hartman et al. | 717/125 |
| 2003/0070119 | A1* | 4/2003 | Dallin | 714/38 |
| 2004/0041827 | A1* | 3/2004 | Bischof et al. | 345/704 |
| 2004/0148590 | A1* | 7/2004 | Lapitski et al. | 717/124 |
| 2005/0160322 | A1* | 7/2005 | West et al. | 714/38 |
| 2005/0172270 | A1* | 8/2005 | Dathathraya et al. | 717/124 |
| 2005/0188271 | A1* | 8/2005 | West et al. | 714/38 |
| 2005/0268285 | A1* | 12/2005 | Bagley et al. | 717/124 |
| 2007/0022407 | A1* | 1/2007 | Givoni et al. | 717/124 |
| 2007/0092069 | A1* | 4/2007 | Royzen et al. | 379/27.04 |
| 2008/0092119 | A1* | 4/2008 | Sweis | 717/124 |
| 2008/0127095 | A1* | 5/2008 | Brennan et al. | 717/124 |
| 2008/0133210 | A1* | 6/2008 | Chagoly et al. | 703/22 |
| 2009/0037914 | A1* | 2/2009 | Chagoly et al. | 718/101 |
| 2009/0083325 | A1* | 3/2009 | Belide et al. | 707/104.1 |
| 2009/0307763 | A1* | 12/2009 | Rawlins et al. | 726/5 |
| 2010/0229155 | A1* | 9/2010 | Adiyapatham et al. | 717/124 |
| 2011/0123973 | A1* | 5/2011 | Singh | 434/322 |
| 2011/0239198 | A1* | 9/2011 | Sweis | 717/135 |
| 2011/0252073 | A1* | 10/2011 | Pauly | 707/812 |
| 2011/0258600 | A1* | 10/2011 | Osenkov et al. | 717/124 |
| 2011/0314343 | A1* | 12/2011 | Hoke et al. | 714/45 |
| 2012/0192153 | A1* | 7/2012 | Venkatraman et al. | 717/124 |
| 2012/0260129 | A1* | 10/2012 | Wilson et al. | 714/32 |

* cited by examiner

*Primary Examiner* — Don Wong
*Assistant Examiner* — Daxin Wu
(74) *Attorney, Agent, or Firm* — Davidson Berquist Jackson & Gowdey LLP (57) ABSTRACT

An application under test may be run in a test mode that receives a series of test scenarios and produces a set of test results under the control of a verification application. The verification application utilizes "typed-data" (i.e., data having known types that are associated with the data itself, e.g., XML-based data) such that a number of parameters can be set for each event and a number of result parameters can be checked for each result in at least one script. A series of scripts can be combined into an action file that may invoke scripts and override parameters within the invoked scripts. The events can be sent and received using a number of messaging protocols and communications adapters.

19 Claims, 6 Drawing Sheets

Figure 1

```
<Script name="Create_Quote" step='Step 0'>
    <SendRequest
        cmd.TxnType='Txn'
        cmd.MID='QATest1'
        cmd.Cache='Quote'
        cmd.Action='Create'
        cmd.TIF='Day'
        cmd.Side='Bid'
        cmd.Price='205'
        cmd.Qty='100'
        cmd.ProductID='110625995'
        cmd.UserID='10'
        cmdExecInst='None'
        cmd.StopPx='0'
        cmd.ReserveQty='0'
        cmd.OrdType='Limit'
        step='Send Request' />

<WaitForEvent cache='Quote' ttl='100' step='Step 1.0'>

<VerifyEvent validate="Price == cmd.Price"
            onsuccessprint = 'Valid State [$event.Price]'
            onfailprint = 'State Invalid [$event.Price]'
            printdata='true'
            step='1' />

<VerifyEvent validate="Qty== cmd.Qty"
            onsuccessprint = 'Valid State [$event.Qty]'
            onfailprint = 'State Invalid [$event.Qty]'
            printdata='true'
            step='2' />

<VerifyEvent validate="ProductID== cmd.ProductID"
            onsuccessprint = 'Valid State [$event.ProductID]'
            onfailprint = 'State Invalid [$event.ProductID]'
            printdata='true'
            step='3' />
    </WaitForEvent>
    ...

</Script>
```

Figure 2

| TestCase | name | description | cmd.TxnType | cmd.TxnID | cmd.Action | cmd.Cation | cmd.step | cmd.ProductID | cmd.UserID | cmd.OrdType | cmd.Side | cmd.price |
|---|---|---|---|---|---|---|---|---|---|---|---|---|
| TC_Quote_Edits_0 | Reset_Server | Resets Server | | | | | | | | | | |
| TC_Quote_Edits_1 | Quote_Edits | Test Non-existing ProductID | Txn | QATest 1 | Create | Quote | Send Request | 123456789 | 1 | Limit | Bid | 205 |
| TC_Quote_Edits_3 | Quote_Edits | Test negative numeric ProductID | Txn | QATest 1 | Create | Quote | Send Request | -110625995 | 1 | Limit | Bid | 205 |
| HTC_Quote_Edits_4 | Quote_Edits | Test null ProductID | Txn | QATest 1 | Create | Quote | Send Request | | 1 | Limit | Bid | 205 |
| TC_Quote_Edits_6 | Quote_Edits | Test customer (non-market maker) UserID is entered to create a quote | Txn | QATest 1 | Create | Quote | Send Request | 110625995 | 21 | Limit | Bid | 205 |
| TC_Quote_Edits_10 | Quote_Edits | Test when order type is a value other than market or limit | Txn | QATest 1 | Create | Quote | Send Request | 110625995 | 1 | Test | Bid | 205 |

Figure 3

```xml
<?xml version="1.0" encoding="UTF-8" ?>
- <VerifyScript>
- <Script name="Quote_Edits" step="Step 0">
        <SendRequest cmd.TxnType="" cmd.MID="" cmd.Cache="" cmd.Action=""
            cmd.TIF="" cmd.Side="" cmd.Price="" cmd.Qty=""
            cmd.ProductID="" cmd.UserID="" cmd.ExecInst=""
            cmd.StopPx="" cmd.ReserveQty="" cmd.OrdType="" step="" />
    - <!-- Response
        -->
    - <WaitForResponse step="Step 1.0">
        <VerifyResponse validate="TxnType == validate.TxnType
            and MID == validate.MID and Text
            like validate.Text"
            onfailprint="*****Quote Response InValid(Create)*****"
            onsuccessprint="*****Quote Response Valid(Create)*****"
            step="1.0" />
        </WaitForResponse>
    </Script>
</VerifyScript>
```

Figure 4

ScriptName Table Structure

| Test_name | Script_name | StepOrder |
|---|---|---|

KeyValuePair Table Structure

| Test_name | Row_No | KeyValuePair |
|---|---|---|

Figure 5

ScriptName Table Data

| TC_Quote_Edits_0 | Reset_Server | 1 |
|---|---|---|
| TC_Quote_Edits_1 | Quote_Edits | 2 |
| TC_Quote_Edits_2 | Quote_Edits | 3 |
| ... | ... | 4 |
| TC_Quote_Edits_n | Quote_Edits | 5 |

Figure 6

KeyValuePair Table Data

| TC_Quotes_Edits_1 | 1 | cmd.TxnType='Txn' |
|---|---|---|
| TC_Quotes_Edits_1 | 2 | cmd.MID='QATest1' |
| TC_Quotes_Edits_1 | 3 | cmd.Action='Create' |

SYSTEM AND METHOD FOR AUTOMATING TESTING OF COMPUTERS

FIELD OF INVENTION

The present invention is directed to a system and method for automating the testing of computer systems, and in one embodiment to a system and method for utilizing "typed-data" (e.g., XML-based data) to automate the testing of application use cases against an application under test.

DISCUSSION OF THE BACKGROUND

As the complexity of software increases, and as the number of programmers and/or developers increases, software projects begin to require more control over the development cycle. One development in multi-programmer software is the use of a source code control system or a version control system (SCCS/VCS), including a number of open source SCCS/VCS systems. SCCS/VCS systems enable computer programming files (e.g., source code control files, configuration files) to be put through a development cycle which typically involves checking out one or more programming files, assembled the checked out programming files into one or more programs (e.g., by compiling and linking the programming files), and checking back in the programming files along with documentation on what changes and/or additions were made. Testing the resulting one or more programs can also be added to the development cycle, with the testing occurring before or after the check in process. SCCS/VCS systems can further be integrated into continuous integration (CI) tools, such as Hudson and Jenkins.

The testing of the resulting one or more programs can be a major part of the time required for a development cycle. Often quality assurance (QA) testers run the programs through a series of tests to see if the programs perform as expected. However, manually testing each scenario of a test suite can be both error prone and time consuming. Furthermore, the recording and display of manual tests can also be both error prone and time consuming.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
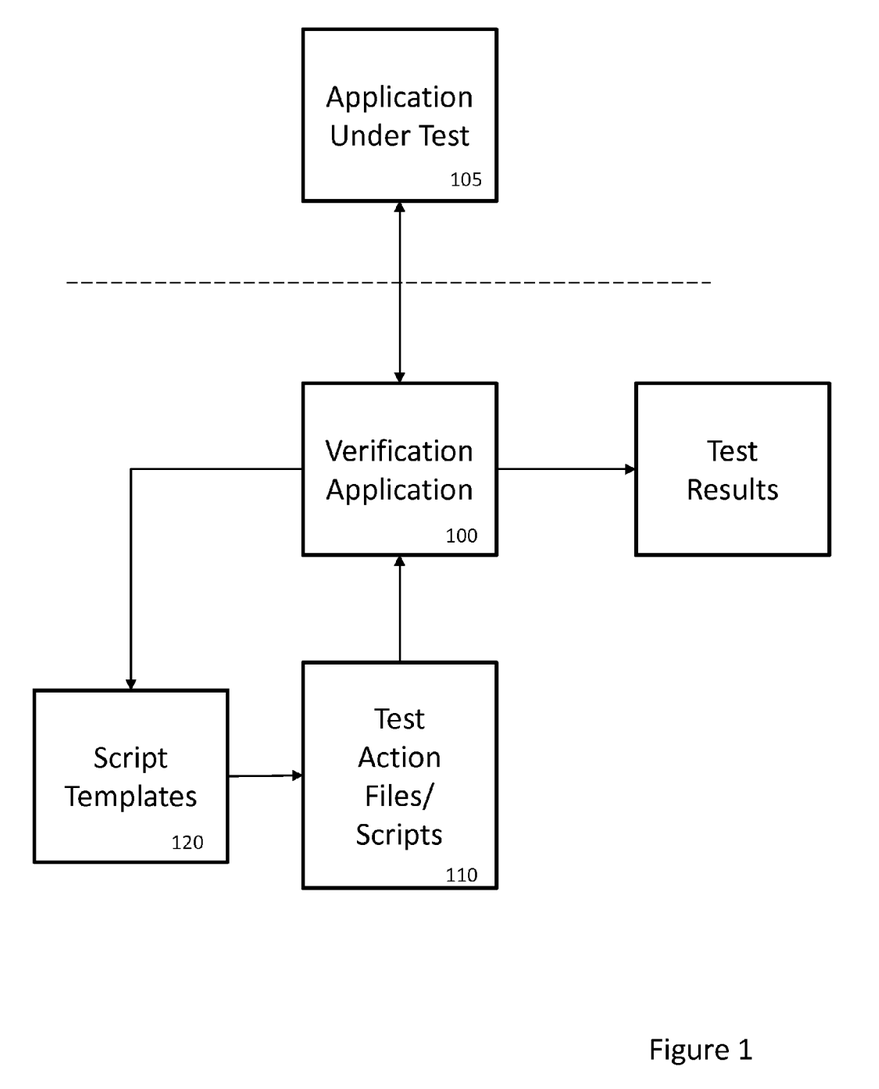
FIG. 1 is block diagram of a testing system in which a verification application can perform a series of test on an application under test and receive a series of results from the application under test to determine if the application under test is operating as expected.

Turning to FIG. 1, an application under test (AUT) 105 has been produced (e.g., compiled/linked or written for an interpretive environment), and it may be run in a test mode that receives a series of test scenarios and produces a set of test results. The testing involves the creation of and response to a number of testing events. In a preferred embodiment, the testing events are based on "typed-data" (i.e., data having known types that are associated with the data itself, e.g., XML-based data) such that a number of parameters can be set for each event and a number of result parameters can be checked for each result. The events can be sent and received using a number of messaging protocols (e.g., TCP/IP, 29 West and/or Financial Information Exchange).

In an exemplary system, a trading-based financial testing application acting as a verification application 100 can be built with testing procedures for verifying that a trading system (acting as an application under test (AUT) 105) is working properly. For example, as shown in FIG. 1, the verification application 100 is designed to communicate with the AUT 105. In one embodiment, the verification application 100 is configured with information which allows it to identify the AUT 105 for communication. Such configuration may be in the form of a configuration file including information about what machine/server the AUT 105 is running on and/or what machine/server to connect to in the event of a failure of the main machine/server. The configuration file may also optionally include information on what communications port to connect to on the specified machine/server. An exemplary configuration file is shown below:

```
<CONFIGURATION>
    <MAIN_OUTPUT_FILE>COUT</MAIN_OUTPUT_FILE>
    <RESULT_OUTPUT_FILE>./
    out.xml</RESULT_OUTPUT_FILE>
    <EXITONEXCEPTION>False</EXITONEXCEPTION>
        <CONFIGURATION>
        <TYPE>CORE</TYPE>
        <NAME>SESSION</NAME>
    <DIRECTORY>./lib</DIRECTORY>
    <LIBNAME>libServer.so</LIBNAME>
    <SESSIONNAME>ITXSession</SESSIONNAME>
    <NODENAME>miaxftldev01</NODENAME>
        <CONFIGURATION>
        <TYPE>SESSION</TYPE>
        <NAME>miaxftldev01</NAME>
        <HOSTNAME>miaxftldev01</HOSTNAME>
        <PORT>1291</PORT>
        </CONFIGURATION>
    </CONFIGURATION>
</CONFIGURATION>
```

After the verification application 100 has connected to the AUT 105, the verification application can request from the AUT 105 a set of configuration information about the AUT 105. Such information can be used by the verification application 100 to determine what kinds of tests can be performed on the AUT 105 and whether requested tests are compatible with the AUT 105. For example, the AUT 105 can provide to the verification application 100 a list of commands supported by the AUT 105 and/or the calling conventions/parameters for those lists of commands. By receiving that information at run-time, the verification application 100 can determine if a command in a script file should in fact be sent to the AUT 105.

Figure 2:
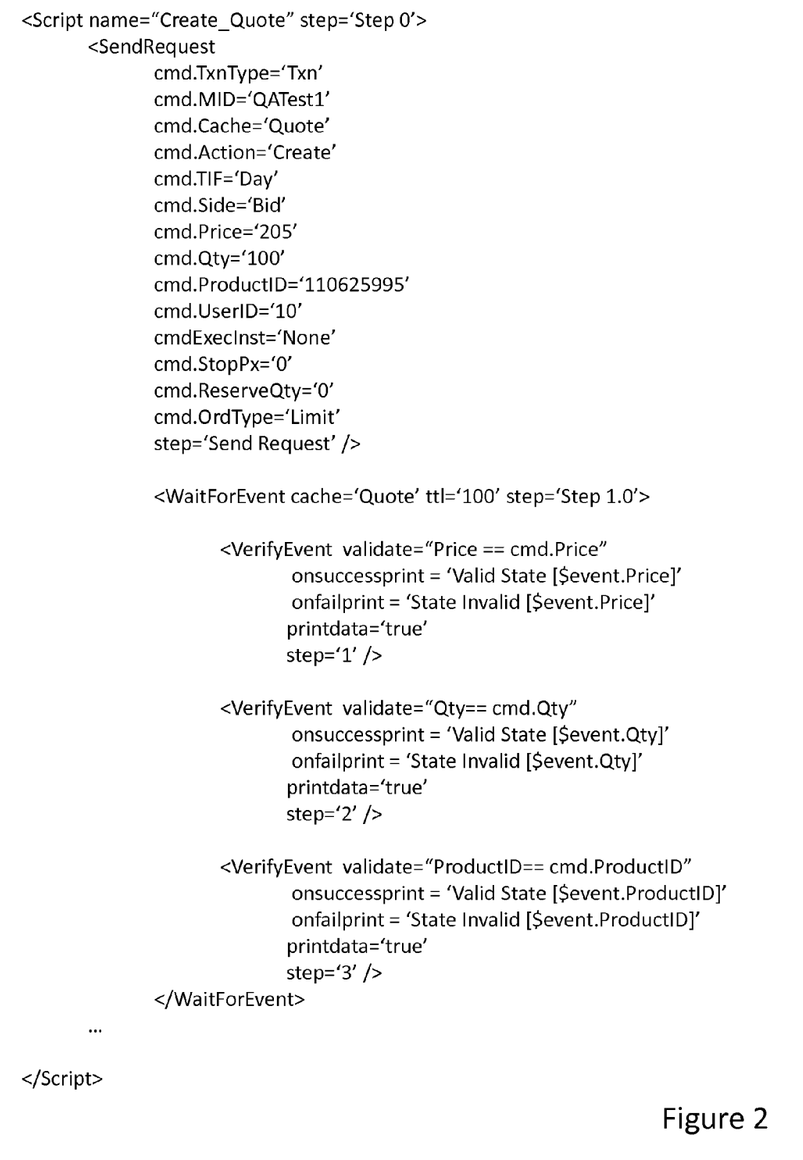
FIG. 2 is an exemplary script for controlling how the verification application performs a series of steps on the application under test.

FIG. 2 illustrates an exemplary script (110 in FIG. 1) that can be read by the verification application 100. The script is formatted as a set of XML-based data that includes typed-data elements that are identified by matched pairs of tags. For example, the line
<Script name="Create_Quote" step='Step 0'>
is matched with its ending tag "</Script>" and everything within the matched tags are considered as part of the script. Alternatively, as shown with respect to the "SendRequest", when all the elements of a data item are contained within a single block, the end data item tag can be implicitly defined by including a '/' character just before an ending '>' for the tag.

As can further be seen, the various data items can include step numbers or identifiers to enable various portions of the script to be performed in a specified order. The step number assigned to a step is included as part of the tag information.

The exemplary script of FIG. 2 is parsed by the verification application 100 and performed in the order specified in the script. The illustrated portion of the script is given a human-readable name (name=Create_Quote") with two main steps: sending a request (using a SendRequest command) and waiting for a series of events (using a WaitForEvent command having three VerifyEvent sub-commands).

When assembling the SendRequest command, the verification application 100 parses each of the various fields of the SendRequest command by reading the corresponding key/value pairs of the form "key=value". The verification application 100 then builds an internal data structure to hold the information specified in the key/value pairs, and transmits the data structure to the AUT 105. In the example of FIG. 2, the "Create_Quote" script is configured (if not overridden) to create a command (named "cmd") that is a named data structure that performs a "Create" Action for a Bid (cmd.Side='Bid') for 200 shares (cmd.Qty='200') of a first financial product (cmd.ProductID='110625995') at a specified price (cmd.Price='205') using a specified type of order (cmd.OrdType='Limit') on behalf of a particular user (cmd.UserID='10'). The data structure may also include a Message ID (cmd.MID='QATest1') and an indication (cmd.Cache='Quote') of what location (or cache) the command is to be handled by.

The script then waits for a resulting event (using the WaitForEvent structure) from the specified command location (cache='Quote') that is the same command location that was specified in the creation of the bid. Upon receipt of the specified event or events, the verification application 100 fills out an internal "event" data structure that can be read, and a number of conditions are verified as specified by "VerifyEvent" structures. For example, the verification application 100 can verify that the specified price in the event data structure for the transaction matches the price specified in the cmd data structure. Similarly, the verification application 100 can verify that the specified quantity and productID of the transaction matches the quantity and productID, respectively, specified in the cmd data structure. For each of the verifications, the verification application 100 can print information depending on whether the verification was successful or unsuccessful. When successful, the verification application 100 prints the state information specified in the "onsuccessprint" key/value pair. When unsuccessful, the verification application 100 prints the state information specified in the "onfailprint" key/value pair. The verification application 100 can further combine the results of a hierarchy of events such that a quality assurance tester can quickly see which event failed and then "drill down" to the cause by looking at greater and greater detail of the event. For example, the printed test results can show that the Step 1.0 failed and then the printed information can show which of the sub-steps caused the failure (e.g., step 2 failed while steps 1 and 3 were successful). If Step 1.0 was a sub-step in a series of other events, then the results of step 1.0 would themselves be part of the results for the step(s) that called them. In order to better enable this hierarchical review of results, a display technique such as a TreeView component or a tree-based Dynamic HTML (DHTML) document can be used such that error-free portions of the results are shown in a collapsed view and at least a portion of the results with errors are shown in an expanded view.

The verification application 100 can utilize script re-use by processing "action files" which incorporate one or more script files and optionally redefine values specified within the referenced script(s). As shown below, an action script (e.g., named Action_test.xml) includes at least one "ExecuteActionScript" command that specifies that script to execute and its parameters.

```
<VerifyScript>
    <Use Case
        ID='Test - Use Case 1'
        Name='Market Maker sends in a Quote'
        Description='A Market Maker is able to send in a quote' />
    <TestCase
        Component='Matching Engine'
        Sub-Component='Quote Behavior'
        Flow='Quotes'
        ID='1'
        Name='A Market Maker is able to send in a Quote'
        Description='Verify that a Market Maker is able to send in a
quote and that it is successfully created in the system'
        Author='InventorName'
        Create_Date='04/04/2011'
        Version='1.0' />
    <ExecuteScriptAction description='Create book'
        name ='Create_Quote' cmd.MID='QATest1'
        cmd.UserID='2' cmd.Side='Bid' cmd.Qty='10'
        cmd.Price='200' />
</VerifyScript>
```

In the "ExecuteScriptAction" commmand, the verification application 100 is commanded to execute the script of FIG. 2, but the cmd.MID, cmd.UserID, cmd.Side, cmd.Qty and cmd.Price variables are overridden with the values passed within the ExecuteScriptAction command. For example, the cmd.UserID value of '10' in the script is overridden with the value of '2' instead, and the cmd.Qty and cmd.Price values are set to '10' and '200', respectively, instead of to '100' and '205, respectively, as defined in the script.

Figure 3:
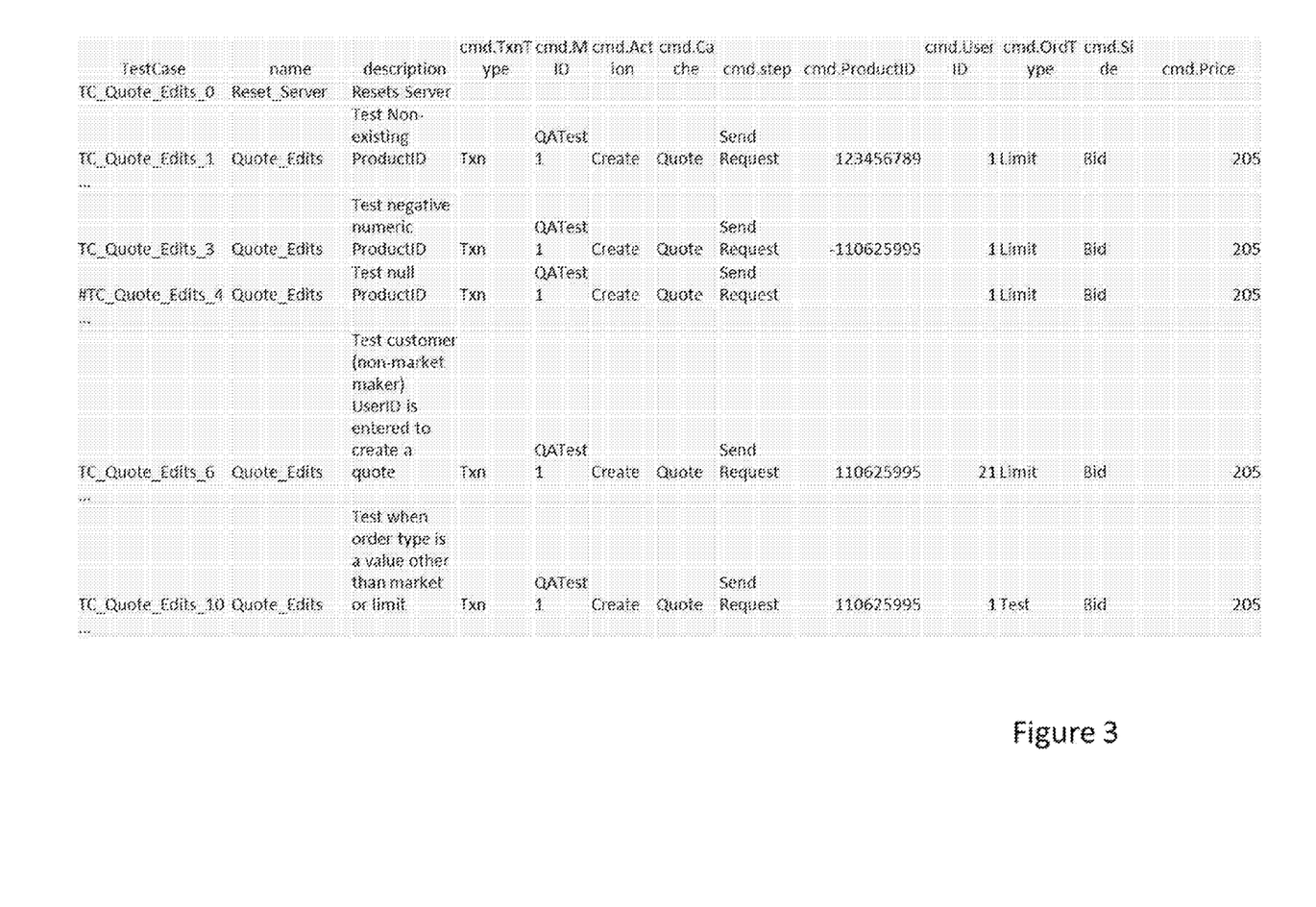
FIG. 3 is an exemplary table format (e.g., as used in a spreadsheet) that is processed and whose values are placed into a template (such as a template of FIG. 4) to build an action file to control how the verification application performs a series of steps on the application under test.

Even with the use of action files and scripts, the manual creation of enough test cases to test the whole system, however, can be time consuming and tedious, especially where a series of similar events all need to be created to test an AUT 105. Instead of directly reading an action file and/or a script and processing the action file/script as described above, a series of test data can be used to create an action file and or scripts from one or more templates. The verification application 100 can read a data table (such as shown in FIG. 3) to automatically create an action file. FIG. 3 shows a partial data table (with other data columns not being shown for the sake of clarity) that contains a row per command to be built and added to an action file. Generally, a series of test cases are provided in a table (with the first row being the data types if they are not already known from the order of the table). Each non-header row of the table is parsed, and a corresponding script template is determined for each row by determining the script name in the "name" column. The verification application 100 then reads in the script template identified in the row, and the variables in the templates are assigned their values from the table on a row-by-row basis. For example, the TC_Quote_Edits_1 test case instructs the verification application 100 to read in the "Quote_Edits" template (shown in FIG. 4) and assign the cmd.TxnType variable to have a value of "Txn" (as was discussed above with respect to FIG. 2). Similarly, the cmd.MID variable is assigned the value of "Create". All the remaining variables are assigned the values in the corresponding row if a value for that variable is specified. If no value is specified, then the resulting script has the default value specified in the template itself.

As shown in the description column, a user can add a description to specify what condition or feature the row is designed to test. Exemplary data fields in the cmd data structure that can be set by the scripts to create exemplary financial transactions include, but are not limited to: cmd.TxnType, cmd.MID, cmd.Action, cmd.Cache, cmd.step, cmd.ProductID, cmd.UserID, cmd.OrdType, cmd.Side, cmd.Price, cmd.StopPx, cmd.Qty, cmd.ReserveQty, cmd.MaxFloor, cmd.TIF, cmd.ExecInst, cmd.UserRole, cmd.DirectedUserID, cmd.State, and cmd.QuoteReEntry. Similarly, exemplary data fields that can be read to test results returned in a "wait" event include, but are not limited to, validate.TxnType, validate.MID, and validate.Text.

Figure 4:
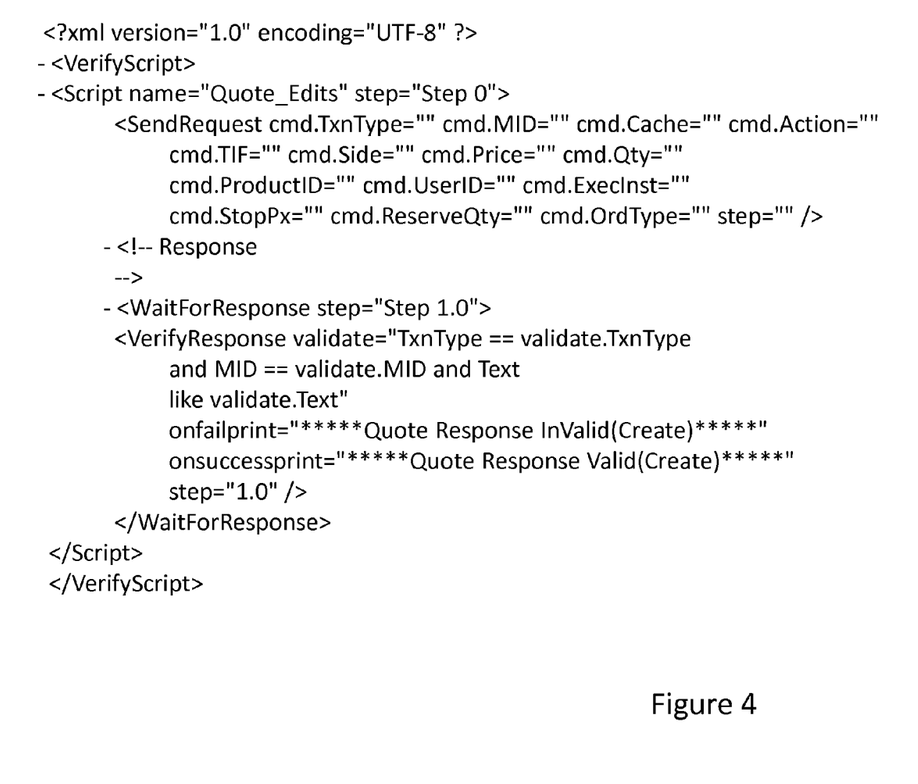
FIG. 4 is an exemplary template for creating an action file to control how the verification application performs a series of steps on the application under test by assigning values from a row of a test data table (such as in FIG. 3)

Using the data table (e.g., as shown in FIG. 3) and script templates (e.g., as shown in FIG. 4) exemplary tests that can be performed on the AUT 105 include, but are not limited to: verifying that an error condition is signaled when a Non-existing ProductID is entered; verifying that an error condition is signaled when a non-numeric ProductID is entered; verifying that an error condition is signaled when a negative numeric ProductID is entered; verifying that an error condition is signaled when a null ProductID is sent; verifying that an error condition is signaled when a Non-existing UserID is entered; verifying that an error condition is signaled when a customer (non-market maker) UserID is entered to create a quote; verifying that an error condition is signaled when a non-numeric UserID is entered; verifying that an error condition is signaled when a negative numeric UserID is entered; verifying that an error condition is signaled when a null UserID is sent; verifying that an error condition is signaled when order type is a value other than market or limit; verifying that an error condition is signaled when order type is Market and has a Price; verifying that an error condition is signaled when order type is Limit and has no Price; verifying that an error condition is signaled when order type is Market and has zero quantity; verifying that an error condition is signaled when order type is Limit and has no quantity; verifying that an error condition is signaled when order type is Limit and has zero quantity; verifying that an error condition is signaled when a null order type is sent; verifying that an error condition is signaled when side is a value other than Bid or Offer; verifying that an error condition is signaled when a null side is sent; verifying that an error condition is signaled when price is zero; verifying that an error condition is signaled when price is negative; verifying that an error condition is signaled when price is non-numeric; verifying that an error condition is signaled when price has a decimal; verifying that an error condition is signaled when a null price is sent; verifying that an error condition is signaled when quantity is zero; verifying that an error condition is signaled when quantity is negative; verifying that an error condition is signaled when quantity is non-numeric; verifying that an error condition is signaled when quantity has a comma; verifying that an error condition is signaled when quantity is not a whole number; verifying that an error condition is signaled when quantity is greater than the value set in cmd.Qty; verifying that an error condition is signaled when a null quantity is sent; verifying that an error condition is signaled when time in force has a value other than Day; verifying that an error condition is signaled when a null time in force is sent; verifying that an error condition is signaled when an "unsigned long" value of (long+1) for Price is sent; verifying that an error condition is signaled when an unsigned long value of (long+1) for ProductID is sent; verifying that an error condition is signaled when an unsigned long value of (long+1) for quantity is sent; verifying that an error condition is signaled when an unsigned long value of (long+1) for UserID is sent; verifying that an error condition is signaled when a side of Bid is sent in lowercase; verifying that an error condition is signaled when a side of Offer is sent in lowercase; verifying that an error condition is signaled when an order type of Market is sent in lowercase; verifying that an error condition is signaled when an order type of Limit is sent in lowercase; and verifying that an error condition is signaled when a time in force of Day is sent in lowercase.

As also shown in FIG. 3, not all rows need process the same script template. The first row of the table indicates that the "Reset_Server" template is to be added to the resulting action file before any of the Quote_Edits template is processed with any of the other rows. This enable the AUT 105 to be placed into a known state before any testing begins.

As discussed above, commands can add to the "cache" of command and/or event information by performing certain commands. The cache that is to be operated on is specified in the field cmd.Cache of the cmd data structure created by the verification application 100. As shown in FIG. 3, the Quote cache is one of the possible caches that can be used by the verification application 100. However, additional caches can likewise be used. As shown in the partial script below, a financial AUT 105 may further include one or more caches for storing order information and may utilize multi-level tests (e.g., using parent/child relationships).

```
<VerifyScript>
    <Script name="Limit_Buy_Order" step="Step 0">
        <SendRequest cmd.TxnType="Txn" cmd.MID="CreateOrderTest1" cmd.Cache="Order"
        cmd.Action="Create" cmd.Owner="3016" cmd.Account="QAACCT" cmd.UserID="21"
        cmd.ClOrdID="QA1" cmd.OrdType="Limit" cmd.OrderQty="700" cmd.Price="200"
        cmd.TimeInForce="Day" cmd.ProductID="110625995" cmd.ExDestination="NA" cmd.Side="Buy"
        cmd.ExecInst="None" cmd.MaxFloor="0" cmd.CustomerOrFirm="PriorityCustomer" step="Send
        Request" />
```

```
        <!-- New Parent Order Created -->
        <WaitForEvent cache="Order" timeout="100" step="Step 1.0">
        <VerifyEvent validate="Account==cmd.Account and UserID==cmd.UserID and ClOrdID==cmd.ClOrdID
        and OrdType==cmd.OrdType and Price==cmd.Price and OrderQty==cmd.OrderQty and
        TimeInForce==cmd.TimeInForce and ProductID==cmd.ProductID and Side==cmd.Side and State=='New'
        and CumQty==0 and NumFills==0 and NumChildren==0 and ParentID=='NA'" onfailprint="*****Order
        Event Data InValid(Create)*****" onsuccessprint="*****Order Event Data Valid(Create)*****"
        printdata="true" step="1.0" />
        </WaitForEvent>
        <!-- New Child Order Created -->
        <WaitForEvent cache="Order" timeout="100" step="Step 2.0">
        <VerifyEvent validate="Account==cmd.Account and UserID==cmd.UserID and ClOrdID like 'NA' and
        OrdType==cmd.OrdType and Price==cmd.Price and OrderQty==cmd.OrderQty and
        TimeInForce==cmd.TimeInForce and ProductID==cmd.ProductID and Side==cmd.Side and State=='New'
        and CumQty==0 and NumFills==0 and NumChildren==0 and ParentID!='NA'" onfailprint="*****Order
        Event Data InValid(Create)*****" onsuccessprint="*****Order Event Data Valid(Create)*****"
        printdata="true" step="2.0" />
        </WaitForEvent>
        <!-- Parent Order Updated with Child Order -->
        <WaitForEvent cache="Order" timeout="100" step="Step 3.0">
        <VerifyEvent validate="Account==cmd.Account and UserID==cmd.UserID and ClOrdID==cmd.ClOrdID
        and OrdType==cmd.OrdType and Price==cmd.Price and OrderQty==cmd.OrderQty and
        TimeInForce==cmd.TimeInForce and ProductID==cmd.ProductID and Side==cmd.Side and State=='New'
        and CumQty==0 and NumFills==0 and NumChildren==1 and ParentID=='NA'" onfailprint="*****Order
        Event Data InValid(Create)*****" onsuccessprint="*****Order Event Data Valid(Create)*****"
        printdata="true" step="3.0" />
        </WaitForEvent>
        <!-- Response -->
        <WaitForResponse step="Step 4.0">
        <!-- <VerifyResponse validate = "Action == 'OK' and MID == 'CreateOrderTest1'" -->
        <VerifyResponse validate="Action == 'OK'" onfailprint="*****Quote Response InValid(Create)*****"
        onsuccessprint="*****Quote Response Valid(Create)*****" step="4.0" />
        </WaitForResponse>
        <!-- Quote Created
        -->
        <WaitForEvent cache="Quote" timeout="100" ttl="1000" step="Step 5.0">
        <VerifyEvent validate="ProductID==cmd.ProductID and Price==cmd.Price and Qty==cmd.OrderQty and
        TIF==cmd.TimeInForce and State == 'Open'" onfailprint="*****Quote Event Data InValid(Create)*****"
        onsuccessprint="*****Quote Event Data Valid(Create)*****" printdata="true" step="5.0" />
        </WaitForEvent>
    </Script>
</VerifyScript>
```

While the above has been described with reference to adding information to caches, the verification application 100 may further request that information in the caches be updated on behalf of the verification application 100. As shown in the partial script or action file below, the conditions of an existing order in the "Order" cache are replaced using a "Replace" action.

```
<VerifyScript>
    <Script name="Replace_Order4" step="0">
        <SendRequest cmd.TxnType="Txn"
        cmd.MID="ReplaceOrderTest1" cmd.Cache="Order"
        cmd.Action="Replace" cmd.UserID="21"
        cmd.OrigClOrdID="QA1" cmd.ClOrdID="Replace_QA1"
        cmd.ProductID="110625995" cmd.OrderQty="800"
        cmd.Side="Buy" cmd.TimeInForce="Day"
        cmd.OrdType="Limit" step="Send Request" />
        <!-- Response -->
        <WaitForResponse step="Step 1.0">
        <VerifyResponse validate="TxnType == 'Exception' and
        MID == 'ReplaceOrderTest1'"
        onfailprint="*****Quote Response InValid(Create)*****"
        onsuccessprint="*****Quote Response
        Valid(Create)*****" step="1.0" />
        </WaitForResponse>
    </Script>
</VerifyScript>
```

As described above, the verification application 100 may request from the AUT 105 a schema that describes the types of commands that can be sent to the AUT 105 in order to allow the verification application 100 to test a portion of a script before actually sending the resulting command to the AUT 105. Exemplary schema for the Order cache and the Quote cache are shown below in the attached appendix which forms a portion of this specification.

Figure 5:
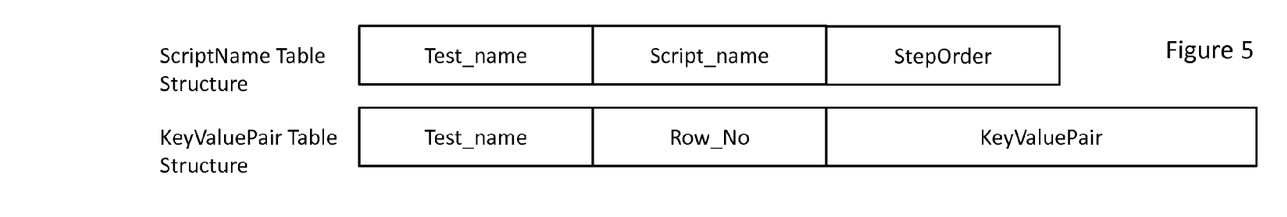
FIG. 5 is a block diagram of a schema (containing two table definitions) for storing script generation information.
Figure 6:
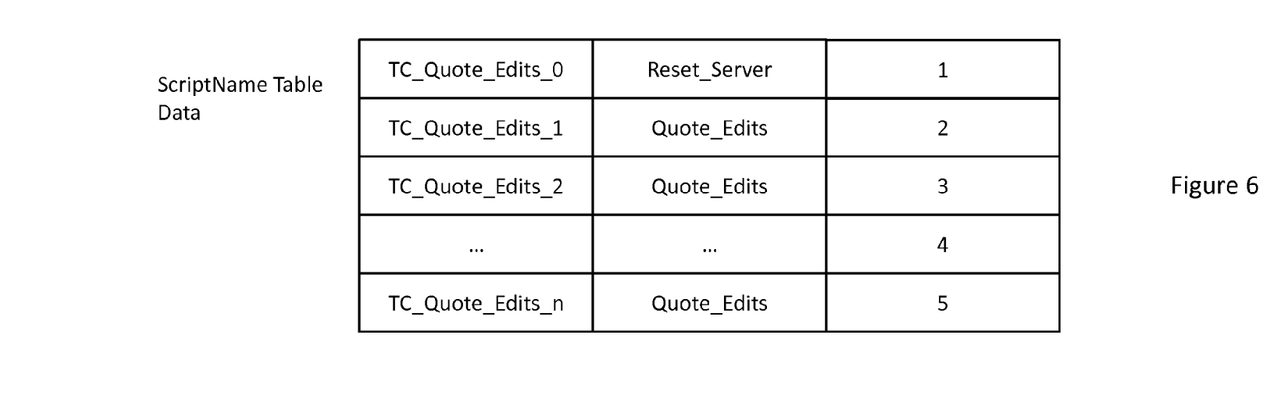
FIG. 6 is a block diagram of a first table having the structure of a portion of the schema of FIG. 5 for storing action file generation information.
Figure 7:
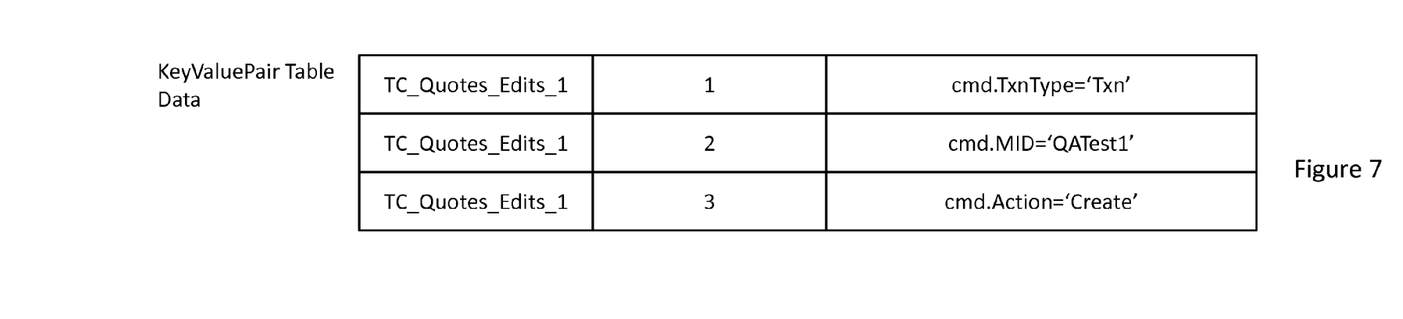
FIG. 7 is a block diagram of a second table having the structure of a portion of the schema of FIG. 5 for storing action file generation information.
Figure 8:
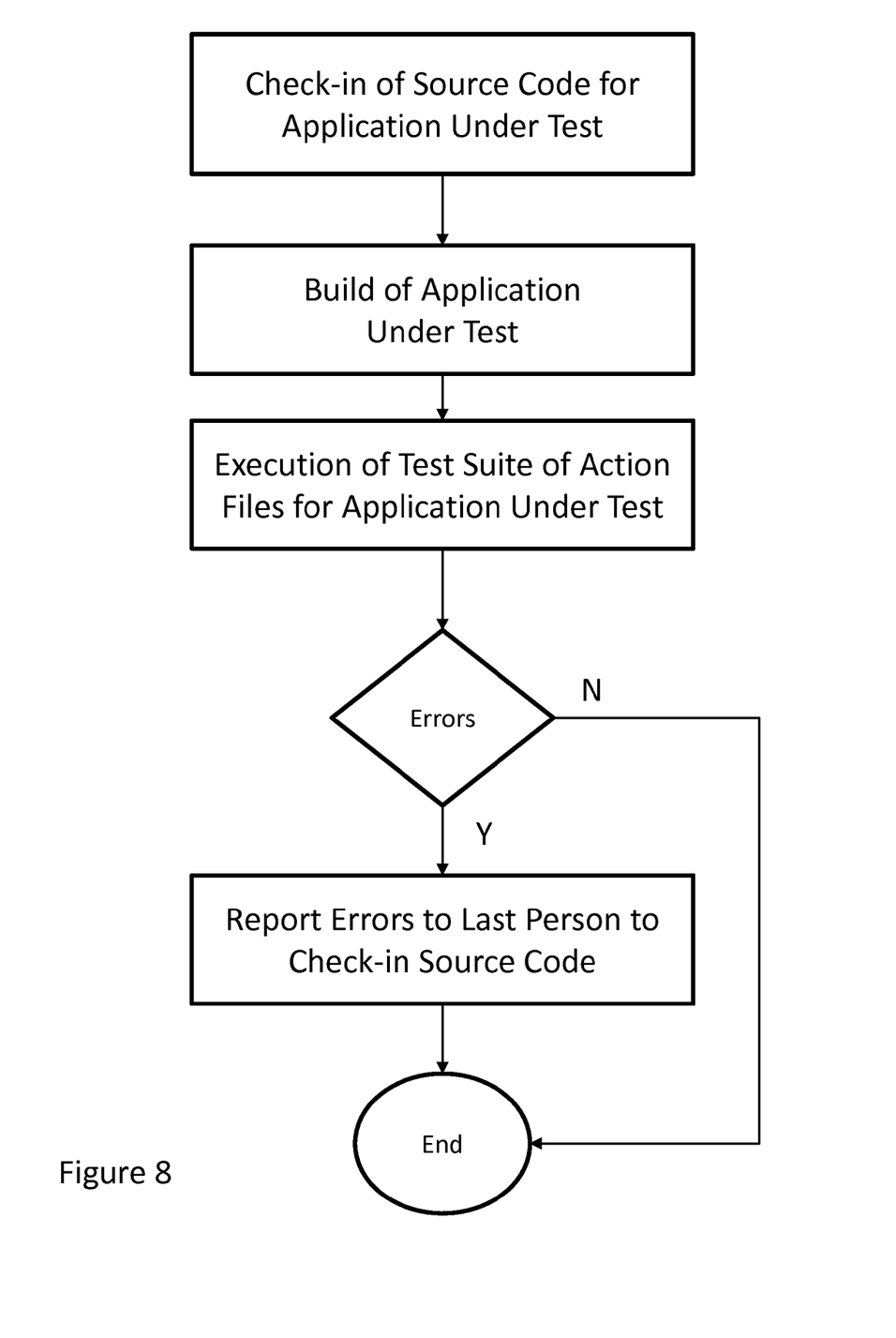
FIG. 8 is a flowchart showing an automated testing procedure integrated with or interacting with a source code control system.

In addition to the verification application 100 being able to convert data tables and script templates to a series of scripts and/or action files, it is alternatively possible to utilize a stand-alone tool to generate scripts and/or action files from the data tables and script templates such that the script and/or action file generation functions can be separated from the script processing functions of the verification application 100. Furthermore, the above discussion of data tables should be understood by those of ordinary skill in the art to include any mechanism for readings "rows" of data that are to be processed to create the scripts from the templates. The creation of such data tables can be from spreadsheets, delimited files (e.g., using commas or tabs as delimiters), databases, or XML files. Preferably the creation of the data tables allows the fields corresponding to each column to be specified dynamically at run-time (e.g., using header rows), but fixed formats can be utilized as well (e.g., when reading from a fixed structure record of a database). Alternatively, each row of data to be applied to a template can be created from a series of records (e.g., of a database) by "joining" them with a common identifier (e.g., a row number). For example, as shown in FIG. 5, a ScriptName table can be created that stores rows of test names, script names and the order that the scripts are supposed to be run in as part of the script to be created. A KeyValuePair table can also be created that stores the parameters that are to be used with each test when creating a script from a template. As shown in FIG. 6, each of the rows of the ScriptName table can be read, in order. Then for each row in the ScriptName table a set of parameters can be loaded from the KeyValuePair table to build the parameters to be used in the corresponding template. The data from FIGS. 6 and 7 can be used (with additional key/value pairs) to generate test cases as shown in FIG. 3 which can then be processed as described above with respect to FIGS. 3 and 4.

In one embodiment of the above-described system, the verification application 100 is integrated with or works in conjunction with a source code control system (SCCS). In that embodiment, when source code has been checked into the SCCS and once the AUT 105 has been built (compiled, linked, programming scripts generated, etc.) and launched, the verification application 100 is automatically launched so that an action script or a specified set of action scripts is executed by the verification application 100. The results of the action script(s) are then analyzed for errors (e.g., by looking for specific tags in the typed-data which represents the results). If there are errors, the verification application 100 can send an error report (e.g., via email, text message, or a post to a wiki) to the quality assurance contact (e.g., specified in the "make" file) and/or to the person that most recently checked back in the code.

The above method and system can be implemented on a digital computer by causing a processor (e.g., a microprocessor (such as 80×86 compatible processor, a 680×0 compatible processor or a RISC processor), a system on a chip, or a custom processor) of the digital computer to execute computer code instructions contained in a digital computer memory (e.g., volatile memory such as RAM or non-volatile memory such as flash memory or ferroelectric memory) of the digital computer. The computer code instructions typically are read from a non-volatile storage device (e.g., an optical drive (such as a CD-ROM drive, DVD-drive or a BluRay Drive), a magnetic drive (such as a magnetic hard drive) or a semiconductor-based drive (such as a solid state drive)) into the digital computer memory (e.g., under the control of an operating system) before execution of the computer code instructions.

As described above, the events and commands described herein can be sent and received using a number of messaging protocols (e.g., TCP/IP, 29 West and/or Financial Information Exchange). When communicating between the verification application 100 and an AUT 105 on a separate machine, the system can utilize any computer-based communications adapter (e.g., adapters utilizing Ethernet, WiFi (including, but not limited to the 802.11 family of protocols), WiMax, and cellular-based packet communication).

While certain configurations of structures have been illustrated for the purposes of presenting the basic structures of the present invention, one of ordinary skill in the art will appreciate that other variations are possible which would still fall within the scope of the appended claims.

SCHEMA APPENDIX

Schema for Quote Cache

```
<SchemaDictionary>
    <Schema name='Quote' cachetype='JournalCache' id='7000' module='QM'>
        <Attribute name='Side' null='false' key='1' type='enum'
                default='Unknown' mtype="enum">
            <Enum>
                <EnumItem name='Bid' value='0'/>
                <EnumItem name='Offer' value='1'/>
                <EnumItem name='Unknown' value='2'/>
            </Enum>
        </Attribute>
        <Attribute name='QuoteID' null='false' size='21' type='const char *'
                default='NA' mtype="cstr" />
        <Attribute name='Version' null='false' type='unsigned long'
                default='0' mtype="int32_t" />
        <Attribute name='TransID' type='const char *' size='21' default='0'
                mtype="cstr" />
        <Attribute name='ProductID' key='1' type='unsigned long long'
                default='0' mtype="int32_t" />
        <Attribute name='TIF' null='false' type='enum' default='Day'
                mtype="enum">
            <Enum>
                <EnumItem name='Day' value='0'/>
                <EnumItem name='GoodTillCancel' value='1'/>
                <EnumItem name='AtTheOpening' value='2'/>
                <EnumItem name='ImmediateOrCancel' value='3'/>
                <EnumItem name='FillOrKill' value='4'/>
                <EnumItem name='AtTheClose' value='7'/>
                <EnumItem name='WaitOrKill' value='8'/>
                <EnumItem name='Wait' value='9'/>
                        <EnumItem name='AOC' value='10'/>
            </Enum>
        </Attribute>
        <Attribute name='ExecInst' type='enum' default='None' mtype="enum">
            <Enum>
                <EnumItem name='AON' value='G'/>
                <EnumItem name='ISO' value='f'/>
                <EnumItem name='DNI' value='E'/>
                <EnumItem name='DNR' value='F'/>
                <EnumItem name='MiaxOnly' value='x'/>
                <EnumItem name='None' value='z'/>
```

SCHEMA APPENDIX

```
            </Enum>
    </Attribute>
    <Attribute name='LastAction' type='enum' default='NewQuote'
            mtype="enum">
        <Enum>
            <EnumItem name='NewQuote' value='0'/>
            <EnumItem name='Cancel' value='1'/>
            <EnumItem name='Replace' value='2'/>
            <EnumItem name='ReplaceAcked' value='3'/>
            <EnumItem name='ReplaceRejected' value='4'/>
            <EnumItem name='Canceled' value='5'/>
            <EnumItem name='CancelRejected' value='6'/>
            <EnumItem name='NewRejected' value='7'/>
            <EnumItem name='NewQuoteAcked' value='8'/>
            <EnumItem name='FillOccurred' value='9'/>
            <EnumItem name='ProductHalted' value='10'/>
            <EnumItem name='ProductMigrating' value='11'/>
            <EnumItem name='ProductMigrated' value='12'/>
            <EnumItem name='RiskPurged' value='13'/>
            <EnumItem name='RiskWidened' value='14'/>
            <EnumItem name='ReEntryNotRequired' value='15'/>
            <EnumItem name='Locked' value='16'/>
                        <EnumItem name='Unlocked' value='17'/>
                        <EnumItem name='OrderQuoteRouted'
            value='18'/>
        </Enum>
    </Attribute>
    <Attribute name='Seq' type='unsigned long' default='0'
            mtype="int32_t" />
    <Attribute name='Qty' type='long long' default='0' mtype="int32_t" />
    <Attribute name='MaxFloor' type='long long' default='0'
            mtype="int32_t" />
    <Attribute name='ReserveQty' type='long long' default='0'
            mtype="int32_t" />
    <Attribute name='UserID' key='1' type='unsigned long' default='0'
            mtype="int32_t" />
    <Attribute name='LastUserID' type='unsigned long' default='0'
            mtype="int32_t" />
    <Attribute name='DirectedUserID' type='unsigned long' default='0'
            mtype="int32_t" />
    <Attribute name='UserRole' null='false' type='enum' default='Cust'
            mtype="enum">
        <Enum>
            <EnumItem name='Cust' value='0'/>
            <EnumItem name='LMM' value='1'/>
            <EnumItem name='MM' value='2'/>
            <EnumItem name='DMM' value='3'/>
            <EnumItem name='NonCust' value='4'/>
        </Enum>
    </Attribute>
    <Attribute name='Price' type='long long' default='0' mtype="int32_t"
            />
    <Attribute name='StopPx' type='long long' default='0' mtype="int32_t"
            />
    <Attribute name='State' type='enum' default='Open' mtype="enum">
        <Enum>
            <EnumItem name='Open' value='0'/>
            <EnumItem name='Closed' value='1'/>
            <EnumItem name='Lock' value='2'/>
            <EnumItem name='Migrating' value='3'/>
            <EnumItem name='Migrated' value='4'/>
        </Enum>
    </Attribute>
    <Attribute name='OrdType' type='enum' default='Limit' mtype="enum">
        <Enum>
            <EnumItem name='Market' value='1'/>
            <EnumItem name='Limit' value='2'/>
        </Enum>
    </Attribute>
    <Attribute name='Timestamp' type='const char *' size='28'
            mtype="cstr" />
    <Attribute name='QuoteReEntry' type='enum' default='NotReEntry'
            mtype="enum">
        <Enum>
            <EnumItem name='NotReEntry' value='N'/>
            <EnumItem name='IsReEntry' value='Y'/>
        </Enum>
    </Attribute>
```

SCHEMA APPENDIX

```
            <Attribute name='CancelOnTimer' type='enum'
        default='TimerNotCancel' mtype="enum">
            <Enum>
                <EnumItem name='TimerCancel' value='0'/>
                <EnumItem name='TimerNotCancel' value='1'/>
            </Enum>
        </Attribute>
    </Schema>
</SchemaDictionary>
```

Schema for Order Cache

```
<SchemaDictionary>
    <Schema name = 'Order' cachetype='JournalCache' id='3000' module='OM'>
        <Attribute name='Account' null='false' size='11' type='const char *'
                    default='NA'/>
        <Attribute name='UserID' null='false' type='unsigned long'
                    default='0'/>
        <Attribute name='LastUserID' type='unsigned long' default='0'/>
        <Attribute name='DirectedUserID' null='false' type='unsigned long'
                    default='0'/>
        <Attribute name='Version' null='false' type='unsigned long'
                    default='0'/>
        <Attribute name='ClearingAccount' null='false' size='4' type='const
                    char *' default='NA'/>
        <Attribute name='ClOrdID' null='false' size='33' type='const char *'
                    default='NA'/>
        <Attribute name='OrigClOrdID' size='33' type='const char *'
                    default='NA'/>
        <Attribute name='OrderID' null='false' size='21' type='const char *'
                    key='1' default='NA'/>
        <Attribute name='ParentID' null='false' size='21' type='const char
                    *' default='NA'/>
        <Attribute name='OpenClose' null='false' type='enum' default='Open'>
            <Enum>
                <EnumItem name='Open' value='O'/>
                <EnumItem name='Close' value='C'/>
            </Enum>
        </Attribute>
        <Attribute name='OrdType' null='false' default='Limit' type='enum'>
            <Enum>
                <EnumItem name='Market' value='1'/>
                <EnumItem name='Limit' value='2'/>
                <EnumItem name='Stop' value='3'/>
                <EnumItem name='StopLimit' value='4'/>
            </Enum>
        </Attribute>
        <Attribute name='Price' type='long long' default='0'/>
        <Attribute name='OrderQty' type='long long' default='0'/>
        <Attribute name='MaxFloor' type='long long' default='0'/>
        <Attribute name='StopPx' type='long long' default='0'/>
        <Attribute name='ExecInst' type='enum' default='None'>
            <Enum>
                <EnumItem name='Held' value='5'/>
                <EnumItem name='ISO' value='f'/>
                <EnumItem name='DNI' value='E'/>
                <EnumItem name='DNR' value='F'/>
                <EnumItem name='AON' value='G'/>
                <EnumItem name='RestateOnTradingHalt' value='J'/>
                <EnumItem name='CancelOnTradingHalt' value='K'/>
                <EnumItem name='MiaxOnly' value='x'/>
                <EnumItem name='None' value='z'/>
            </Enum>
        </Attribute>
        <Attribute name='TimeInForce' type='enum' default='Day'>
            <Enum>
                <EnumItem name='Day' value='0'/>
                <EnumItem name='GoodTillCancel' value='1'/>
                <EnumItem name='AtTheOpening' value='2'/>
                <EnumItem name='ImmediateOrCancel' value='3'/>
                <EnumItem name='FillOrKill' value='4'/>
                <EnumItem name='GoodTillDate' value='6'/>
                <EnumItem name='AtTheClose' value='7'/>
                <EnumItem name='WaitOrKill' value='8'/>
                <EnumItem name='Wait' value='9'/>
     <EnumItem name='AOC' value='10'/>
            </Enum>
        </Attribute>
        <Attribute name='CustomerOrFirm' type='enum' default='Invalid'>
```

SCHEMA APPENDIX

```
<Enum>
    <EnumItem name='PriorityCustomer' value='0'/>
    <EnumItem name='Firm' value='1'/>
    <EnumItem name='MemberBrokerDealer' value='2'/>
    <EnumItem name='NonMemberBrokerDealer' value='3'/>
    <EnumItem name='MemberMarketMaker' value='4'/>
    <EnumItem name='NonMemberMarketMaker' value='5'/>
    <EnumItem name='ProfessionalCustomer' value='8'/>
    <EnumItem name='Invalid' value='9'/>
</Enum>
</Attribute>
<Attribute name='ProductID' type='unsigned long long' default='0'/>
<Attribute name='TransID' type='const char *' size='21' default='0'/>
<Attribute name='SecurityExchange' type='const char *' size='16'
            default='ITX'/>
<Attribute name='ExecBroker' type='const char *' size='17'
            default='NA'/>
<Attribute name='ExDestination' type='const char *' size='17'
            default='NA'/>
<Attribute name='CoveredOrUncovered' type='enum' default='Covered'>
    <Enum>
        <EnumItem name='Covered' value='0'/>
        <EnumItem name='Uncovered' value='1'/>
    </Enum>
</Attribute>
<Attribute name='ClearingFirm' type='const char *' size='4'
            default='ITX'/>
<Attribute name='ClientID' null='false' type='unsigned long'
            default='0'/>
<Attribute name='Side' null='false' type='enum' default='NoSide'>
    <Enum>
        <EnumItem name='Buy' value='1'/>
        <EnumItem name='Sell' value='2'/>
        <EnumItem name='BuyMin' value='3'/>
        <EnumItem name='SellSht' value='5'/>
        <EnumItem name='SellShtEx' value='6'/>
        <EnumItem name='NoSide' value='0'/>
    </Enum>
</Attribute>
<Attribute name='State' type='enum' default='StateNotSet'>
    <Enum>
        <EnumItem name='New' value='0'/>
        <EnumItem name='Canceled' value='1'/>
        <EnumItem name='Partial' value='2'/>
        <EnumItem name='Filled' value='3'/>
        <EnumItem name='Expired' value='4'/>
        <EnumItem name='Rejected' value='5'/>
        <EnumItem name='PendingCancel' value='6'/>
        <EnumItem name='PendingReplace' value='7'/>
<EnumItem name='RoutingAway' value='8'/>
        <EnumItem name='StateNotSet' value='999'/>
    </Enum>
</Attribute>
<Attribute name='CumQty' type='long long' default='0'/>
<Attribute name='AvgPx' type='long long' default='0'/>
<Attribute name='NumFills' type='unsigned long' default='0'/>
<Attribute name='NumChildren' null='false' type='unsigned long'
            default='0'/>
<Attribute name='LastAction' type='enum' default='NewOrder'>
    <Enum>
        <EnumItem name='NewOrder' value='0'/>
        <EnumItem name='Cancel' value='1'/>
        <EnumItem name='Replace' value='2'/>
        <EnumItem name='ReplaceAcked' value='3'/>
        <EnumItem name='ReplaceRejected' value='4'/>
        <EnumItem name='CancelAcked' value='5'/>
        <EnumItem name='CancelRejected' value='6'/>
        <EnumItem name='NewRejected' value='7'/>
        <EnumItem name='NewOrderAcked' value='8'/>
        <EnumItem name='FillOccurred' value='9'/>
        <EnumItem name='OrderRouted' value='10'/>
        <EnumItem name='Recreate' value='11'/>
<EnumItem name='StopPending' value = '12'/>
        <EnumItem name='StopMonitored' value='13'/>
    </Enum>
</Attribute>
<Attribute name='TransactTime' type='const char *'
            size='28'></Attribute>
```

SCHEMA APPENDIX

```
        <Attribute name='Timestamp' type='const char *'
                   size='28'></Attribute>
        <Attribute name='OrderText' type='const char *'
                   size='51'></Attribute>
        <Attribute name='FIXMsgNum' type='unsigned long'
                   default='0'></Attribute>
        <Attribute name='ITXInternalRouting' type='enum' default='NA'>
            <Enum>
                <EnumItem name='NA' value='0'/>
                <EnumItem name='AwayDone' value='1'/>
                <EnumItem name='RoutedSOR' value='2'/>
                <EnumItem name='RoutedAway' value='3'/>
                <EnumItem name='RoutedBack' value='4'/>
                <EnumItem name='RoutedHUB' value='5'/>
            </Enum>
        </Attribute>
        <Attribute name='Seq' type='unsigned long' default='0'/>
        <Attribute name='SpecialInstructions' type='const char *'
                   size='64'></Attribute>
    </Schema>
</SchemaDictionary>
```

The invention claimed is:

1. A system for testing an application under test, comprising:
   a digital memory for storing computer code instructions independent of computer code instructions of the application under test;
   a processor for controlling the system by reading and executing the computer code instructions stored in the digital memory independent of computer code instructions of the application under test, the processor reading and executing the computer code instructions stored in the digital memory performing the steps of:
   reading an action file representing actions to be performed on the application under test;
   requesting from the application under test a schema of valid actions that can be accepted by the application under test; and
   verifying that actions of the action file are valid based on the schema of valid actions before sending the commands to the application under test;
   requesting that the application under test perform the actions represented in the action file that are valid actions;
   waiting for results that are produced by requesting that the application under test perform the actions represented in the action file; and
   generating a results file representing results of at least one test of the action file.

2. The system as claimed in claim 1, wherein the processor reading and executing the computer code instructions stored in the digital memory further performs the steps of:
   reading a data table comprising a series of data row;
   generating, for each row in the series of rows, a script from a template identified in the each row, utilizing calling parameters specified in the each row.

3. The system as claimed in claim 1, wherein the processor reading and executing the computer code instructions stored in the digital memory further performs the steps of:
   receiving a signal from a source code control system indicating that the application under test is to be built after at least one of changes to and additions to source code used to build the application under test;
   building application under test;
   starting the application under test;
   automatically running the action file to test the application under test; and
   communicating that an error occurred if results of running the application under test indicate that at least one test in the action file returned an unexpected result.

4. The system as claimed in claim 1, wherein the action file is a typed-data data file.

5. The system as claimed in claim 1, wherein the results file is a typed-data data file.

6. The system as claimed in claim 1, wherein the action file contains at least one reference to a script file to be run at a time specified by the action file.

7. The system as claimed in claim 6, wherein the action file contains at least one parameter that overrides a default value in the script file to be run at the time specified by the action file.

8. The system as claimed in claim 1, wherein generating a results file representing results of at least one test of the action file comprises generating a hierarchical results file representing results sub-tests hierarchically with tests containing the sub-tests.

9. The system as claimed in claim 2, wherein the processor reading and executing the computer code instructions stored in the digital memory further performs the steps of:
   receiving a signal from a source code control system indicating that the application under test is to be built after at least one of changes to and additions to source code used to build the application under test;
   building application under test;
   starting the application under test;
   automatically running the action file to test the application under test; and
   communicating that an error occurred if results of running the application under test indicate that at least one test in the action file returned an unexpected result.

10. The system as claimed in claim 2, wherein the action file is a typed-data data file.

11. The system as claimed in claim 2, wherein the results file is a typed-data data file.

12. The system as claimed in claim 2, wherein the action file contains at least one reference to a script file to be run at a time specified by the action file.

13. The system as claimed in claim 12, wherein the action file contains at least one parameter that overrides a default value in the script file to be run at the time specified by the action file.

14. The system as claimed in claim 2, wherein generating a results file representing results of at least one test of the action file comprises generating a hierarchical results file representing results sub-tests hierarchically with tests containing the sub-tests.

15. The system as claimed in claim 3, wherein the action file is a typed-data data file.

16. The system as claimed in claim 3, wherein the results file is a typed-data data file.

17. The system as claimed in claim 3, wherein the action file contains at least one reference to a script file to be run at a time specified by the action file.

18. The system as claimed in claim 17, wherein the action file contains at least one parameter that overrides a default value in the script file to be run at the time specified by the action file.

19. The system as claimed in claim 3, wherein generating a results file representing results of at least one test of the action file comprises generating a hierarchical results file representing results sub-tests hierarchically with tests containing the sub-tests.

* * * * *